(12) United States Patent
Huang

(10) Patent No.: US 10,844,942 B2
(45) Date of Patent: Nov. 24, 2020

(54) POWER SPLIT AND VARIABLE CREEP DRIVE SYSTEM FOR STREET SWEEPER OR LIKE SPECIALTY VEHICLE

(71) Applicant: Federal Signal Corporation, Oak Brook, IL (US)

(72) Inventor: Xiaolun Huang, Naperville, IL (US)

(73) Assignee: Federal Signal Corporation, Oak Brook, IL (US)

( * ) Notice: Subject to any disclaimer, the term of this patent is extended or adjusted under 35 U.S.C. 154(b) by 350 days.

(21) Appl. No.: 15/853,225

(22) Filed: Dec. 22, 2017

(65) Prior Publication Data

US 2018/0195595 A1 Jul. 12, 2018

Related U.S. Application Data

(60) Provisional application No. 62/443,409, filed on Jan. 6, 2017.

(51) Int. Cl.
| | | |
|---|---|---|
| *B60K 25/06* | (2006.01) | |
| *F16H 47/04* | (2006.01) | |
| *E01H 1/05* | (2006.01) | |
| *F16H 61/00* | (2006.01) | |
| *F16H 37/06* | (2006.01) | |
| *F16H 61/4061* | (2010.01) | |
| *B60K 17/28* | (2006.01) | |

(Continued)

(52) U.S. Cl.
CPC ............. *F16H 47/04* (2013.01); *B60K 17/28* (2013.01); *B60K 25/06* (2013.01); *B60W 10/30* (2013.01); *E01H 1/05* (2013.01); *F16H 37/06* (2013.01); *F16H 61/0009* (2013.01); *F16H 61/4061* (2013.01); *F16H 61/421* (2013.01); *F16H 2200/20* (2013.01)

(58) Field of Classification Search
CPC ........ F16H 47/04; F16H 37/06; F16H 37/065; F16H 61/0009; F16H 61/421; F16H 61/425; F16H 1/28; F16H 3/721; F16H 2200/20; E01H 1/05; B60W 10/30; B60W 30/1888; B60W 30/188; B60K 17/04; B60K 17/28; B60K 25/06; B60K 2025/065

See application file for complete search history.

(56) References Cited

U.S. PATENT DOCUMENTS

| | | | | | |
|---|---|---|---|---|---|
| 4,126,994 A | * | 11/1978 | Rockwell | .............. | F16H 61/425 180/6.48 |
| 4,291,592 A | * | 9/1981 | Meyerle | .................. | F16H 47/04 475/81 |

(Continued)

*Primary Examiner* — Steve Clemmons
(74) *Attorney, Agent, or Firm* — Merchant & Gould P.C.

(57) ABSTRACT

A power split and creep drive system for street sweeper or like specialty vehicle having a single engine is disclosed. The system intends to retrofit and convert on-highway truck chassis into specialty vehicles capable of performing work function and moving at creeping speed, such as a street sweeper. It includes a hydraulic work circuit or power-take-off (PTO) port, a planetary gear set, a hydraulic system comprising pumps and motors to drive the working devices and balance the demand between propulsion and work function such as sweeping. The planetary gear set includes an input shaft connecting to a transmission output shaft of the chassis, a first output shaft connecting to a hydraulic machine, and a second output shaft to vehicle propulsion drive shaft.

30 Claims, 3 Drawing Sheets

(51) Int. Cl.
*B60W 10/30* (2006.01)
*F16H 61/421* (2010.01)

(56) References Cited

U.S. PATENT DOCUMENTS

| | | | | | |
|---|---|---|---|---|---|
| 4,554,992 | A | * | 11/1985 | Kassai | E01H 1/042 |
| | | | | | 180/307 |
| 5,335,750 | A | * | 8/1994 | Geringer | B60K 17/10 |
| | | | | | 180/307 |
| 6,073,720 | A | * | 6/2000 | Vanderlinden | E01H 1/05 |
| | | | | | 180/305 |
| 6,615,443 | B2 | * | 9/2003 | Otsuni | E01H 1/05 |
| | | | | | 15/320 |
| 6,663,527 | B2 | * | 12/2003 | Phelan | B60K 17/3462 |
| | | | | | 475/107 |
| 6,948,213 | B2 | * | 9/2005 | Kim | E01H 1/0845 |
| | | | | | 15/320 |
| 7,261,663 | B2 | * | 8/2007 | Miller | B62D 5/0409 |
| | | | | | 475/189 |
| 8,424,630 | B2 | * | 4/2013 | Lenton | B60W 10/06 |
| | | | | | 123/339.18 |
| 8,622,859 | B2 | * | 1/2014 | Babbitt | B60K 6/12 |
| | | | | | 475/1 |
| 8,678,967 | B2 | * | 3/2014 | Reimann | F16H 47/04 |
| | | | | | 475/1 |
| 8,915,327 | B2 | | 12/2014 | Brooker | |
| 9,010,467 | B2 | * | 4/2015 | Burnier | B60K 25/06 |
| | | | | | 180/53.4 |
| 2008/0264189 | A1 | * | 10/2008 | Hancock | B60K 25/00 |
| | | | | | 74/15.82 |
| 2010/0275725 | A1 | * | 11/2010 | Tolksdorf | F16H 47/04 |
| | | | | | 74/732.1 |

* cited by examiner

POWER SPLIT AND VARIABLE CREEP DRIVE SYSTEM FOR STREET SWEEPER OR LIKE SPECIALTY VEHICLE

CROSS REFERENCE TO RELATED APPLICATIONS

This application claims the benefit of U.S. Patent Application Ser. No. 62/443,406, titled POWER SPLIT AND VARIABLE CREEP DRIVE SYSTEM FOR STREET SWEEPER OR LIKE SPECIALTY VEHICLE, filed Jan. 6, 2017, the disclosure of which is hereby incorporated by reference in its entirety.

TECHNICAL FIELD

The present disclosure related to a vehicle power management and creeping drive system and more particularly for a street sweeper or like specialty vehicle to split power from one engine source between work function and vehicle propulsion, and provide an efficient variable speed transmission for creep drive at the meantime.

BACKGROUND

Street sweepers or like specialty vehicles typically require power to drive work equipment, such as fans, brooms, water pumps, conveyors, etc., while travel at creeping speed (0 to 3 miles per hour) or very low speed (5 to 10 miles per hour). On the other hand, these vehicles are also demanded to travel at high speed (over 50 miles per hour) for job site changing, water refilling or debris dumping. One known approach is to mount an equipment body onto a commercial on-highway truck chassis to convert it into a specialty vehicle, such as a street sweeper. Apparently it is desirable if the chassis internal combustion engine (ICE) power can be shared between work equipment and propulsion. But the significant difference between power demands from the work equipment and vehicle propulsion makes the power split very challenging. In a 'work' (such as sweep) mode, the vehicle needs to move slowly, which requires lower engine speed; meanwhile, work equipment runs at full power, which means higher engine speed. To meet with such opposite demands it often leads to add an auxiliary engine dedicated for sweeping or like work functions. Today dual engines are still most popular option in truck-mounted street sweepers. Even so, it is still hard to satisfy some special needs such as street sweepers, because a commercial on-highway chassis is not quite capable of creeping drive without heavily depending on brake assistance.

SUMMARY

It is desirable to have a new device able to retrofit and convert a common on-highway truck chassis to a specialty vehicle such as a street sweeper at lower cost, less modification and higher fuel-efficiency. Therefore, the power split and variable speed transmission which can more efficiently distribute power between work equipment and vehicle propulsion functions of the present disclosure is very beneficial. This is particularly so because the disclosed system provides variable speed creep drive capabilities at a relative lower vehicle cost.

Accordingly, one aspect of the present disclosure is a power split drive system with variable transmission particularly suitable for a single engine street sweeper or like specialty vehicle.

Another aspect of the present disclosure is a more efficient solution to retrofit and convert a commercial on-highway truck chassis to a street sweeper or like specialty vehicle without adding auxiliary engine.

Another aspect of the present disclosure is to provide an alternative method to propel street sweeper or like specialty vehicle at creep speed without using hydraulic motor.

Another aspect of the present disclosure is to provide a more efficient approach to split power between work equipments and vehicle propulsion and create a variable transmission at the same time with less energy waste.

In accordance with the above, an example of the present disclosure receives power from the chassis engine and distributes it between a variable displacement hydraulic pump at a hydraulic work circuit or power-take-off (PTO) port for the work equipment and the vehicle driveline. The vehicle PTO shaft can connect to the input directly or through a set of typical gear arrangement to achieve a more desirable rotational speed. In a preferred form, the torque split is achieved through a planetary gear set, in which the ring gear is as input, the sun gear as first output connecting to a hydraulic machine and the carrier as second output connecting to driveline, respectively. The hydraulic machine is routed to provide additional hydraulic power to the work equipment in a work mode. At given pressure, changing the displacement of the hydraulic machine will change its torque. Thus, similar to changing the engine throttle pedal, the second output speed, i.e. the driveline speed, will be varied by changing the torque at the first output shaft, thanks to the well-known torque split and speed adder characteristic from planetary gear set.

It is notable that the hydraulic machine in this disclosure operates as a pump only in the drive mode. Such a propulsion approach appears more direct and efficient.

Another feature of the present disclosure is that the power split drive system with variable transmission can be inserted into the chassis drive line. This configuration allows for a retrofit solution that is less chassis-dependent, simpler, and lower costs for converting a common truck chassis to be a single engine sweeper, or like specialty vehicle.

DETAILED DESCRIPTION

In general terms, a power split and creep drive system for a street sweeper or like specialty vehicle having a single engine is disclosed. The system can be used to retrofit and convert an on-highway truck chassis into a specialty vehicle capable of simultaneously performing work functions and moving at creeping speed. A street sweeper is an example of such a specialty vehicle, wherein the vehicle can be placed in a creep mode to drive at 0 to 5 miles per hour and power a sweeping system via the same engine. In one aspect, the power split and creep drive system includes a hydraulic work circuit or power-take-off (PTO) port, a planetary gear set, and a hydraulic system comprising pumps and motors to drive the working devices and balance the demand between propulsion and work function, such as sweeping. In one example, the planetary gear set includes an input shaft connecting to a transmission output shaft of the chassis, a first output shaft connecting to a hydraulic machine, and a second output shaft to vehicle propulsion drive shaft. During creep drive mode, the hydraulic machine is substantially a pump and the vehicle is not driven by the hydraulic machine. Instead, the vehicle is mechanically driven by the vehicle engine through the planetary gear set. Controlling the torque in the first output shaft will cause the torque distribution between the input and second output shafts to be distributed one way or the other such that desired rotational speeds can be achieved. Since the chassis engine will power both the propulsion driveline and pumps for work functions through gears at the same time, it will be more compact and efficient. This system is especially suitable for retrofitting and converting an on-highway truck chassis to a street sweeper or a like specialty vehicle where only a single engine is available to split power between work functions and vehicle propulsion at variable creeping speeds. The following is a detailed description of the disclosed system.

Figure 1:
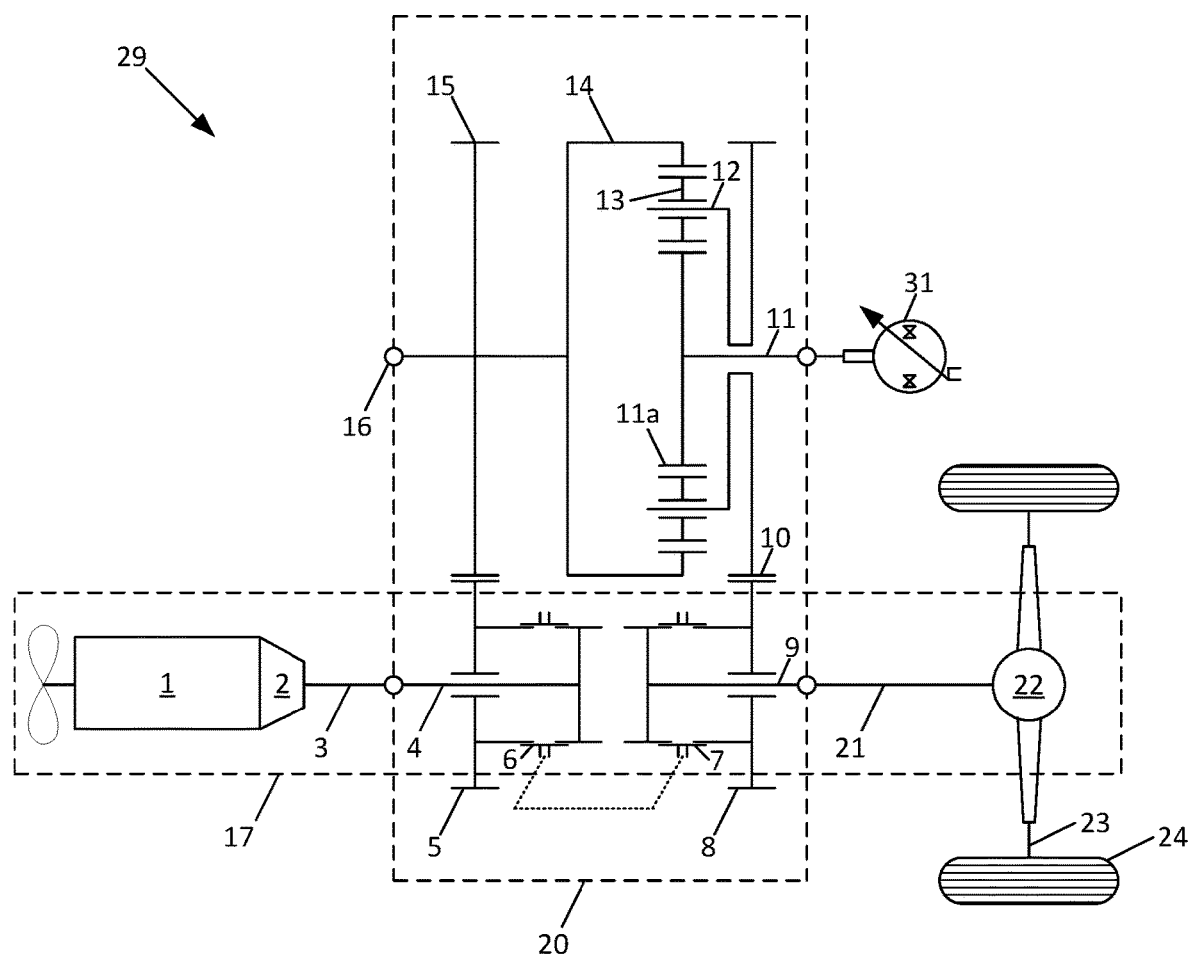
FIG. 1 is a schematic representation of a vehicle having a power split system with variable transmission in accordance with the present disclosure, with the power split system being placed in a work or creep mode.

Referring to FIG. 1, an embodiment of the present disclosure for a single engine street sweeper or like specialty vehicle retrofitted from an on-highway truck chassis is generally presented by the number 29. An on-highway truck chassis assembly 17 will typically include an engine 1, transmission 2, driveline 3 and 21, axle reducer 22, axle 23 and wheels 24. The present disclosure includes a power split and variable speed creep drive (PS-VSCD) device 20 to be inserted between drive shafts 3 and 21. Device 20 provides a shaft output 16 to power work equipment via the hydraulic circuit shown at FIGS. 2, 2A, output shaft 9 to vehicle driveline, and output shaft 11 to hydraulic machine 31 for speed control during 'work (sweep)' mode.

Figure 1A:
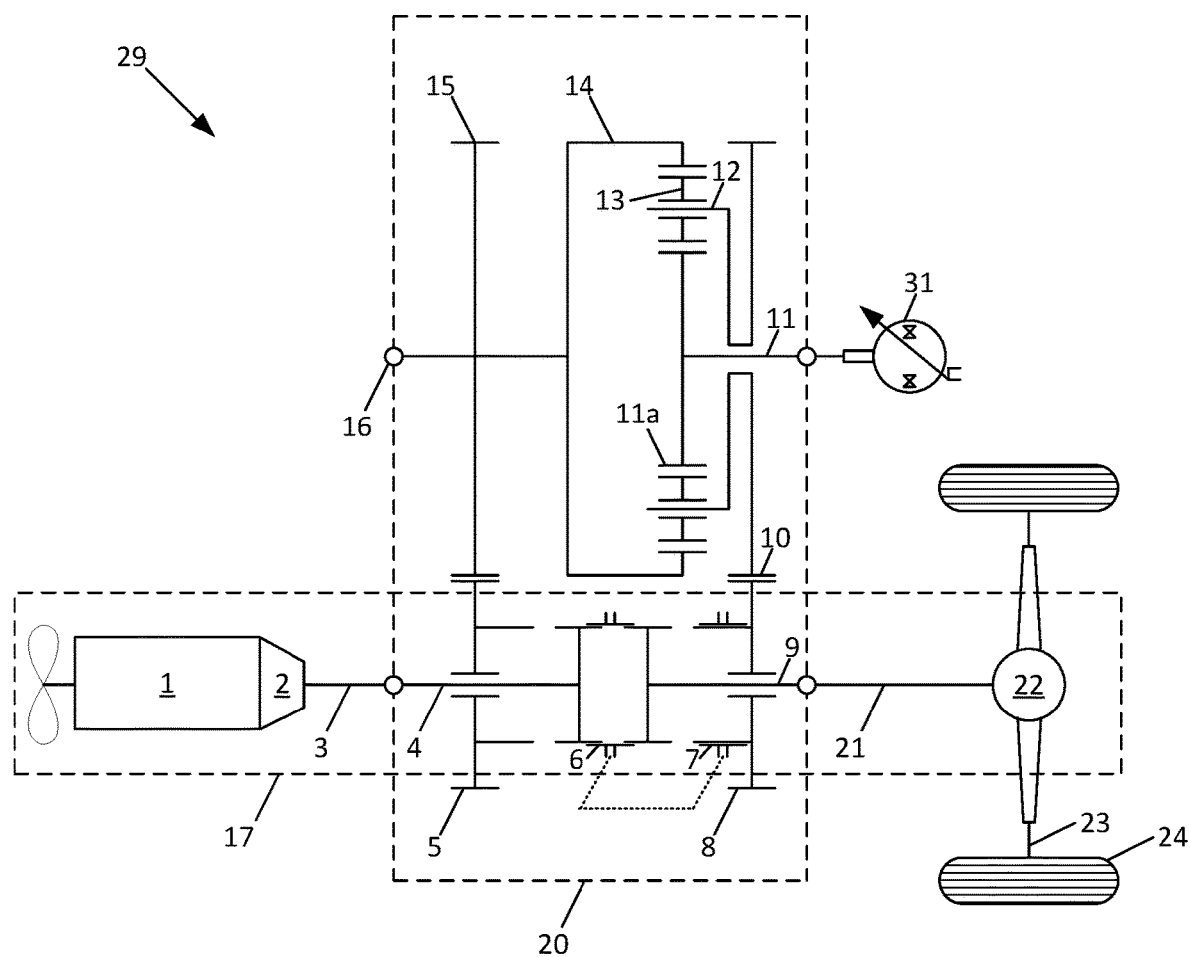
FIG. 1A is a schematic representation of a vehicle having a power split system with variable transmission of FIG. 1, with the power split system being placed in a drive mode.

As shown, the PS-VSCD device 20 includes at least one planetary gear set. A preferred arrangement consists of two couplers 6 and 7 to transfer between a 'creep drive' or 'work (sweep)' mode, as shown at FIG. 1, and a 'transport' or 'drive' mode, as shown at FIG. 1A. At 'work (sweep)' mode, both couplers 6 and 7 are shifted to left which causes the input shaft 4 to connect to ring gear 14 via gears 5 and 15 and output shaft 9 will connect to carrier 12 via gears 8 and 10, respectively. In the creep drive or work mode, the shaft output 16 will also be engaged along with gear 15. This arrangement is shown at FIG. 1.

Shifting both couplers 6 and 7 to the right will convert the vehicle to a 'drive' or 'transport' mode. As coupler 6 shifted right, input shaft 4 will be separated from gear 5 and connected directly to output shaft 9. As coupler 7 shifted right, gear 8 is also no longer engaged with output shaft 9. This arrangement is shown at FIG. 1A. Accordingly, in this mode, the planetary gear set and output shaft 16 will be cut off from the power stream from the engine 1. In essence, the transport mode is simply a restoration of the original chassis configuration in which the engine drives the differential 22 via shafts 3 and 21. The following description will focus on the implementation and operation of the work mode.

To better understand the choice of the device configuration, two important kinematic formulas for a planetary gear set should be understood. The first is the speed adder rule:

$$n_c = An_r + Bn_s \quad (1)$$

where $n_c$, $n_s$ and $n_r$ are angular speeds of the carrier, sun gear and ring gear, respectively, and $$A = \alpha/(1+\alpha), B = 1/(1+\alpha), \alpha = Z_r/Z_s \quad (2)$$

where Zr and Zs are teeth numbers of the ring gear and sun gear, respectively. It is easy to see that from Equation (1) that the carrier speed $n_c$ can be zero when $$n_s = -(A/B)n_r = -\alpha n_r$$

In such a situation the driveline will not rotate and the vehicle will not be propelled. The second kinematic rule is called the torque splitter rule:

$$T_r = AT_c \quad (3)$$

$$T_s = BT_c \quad (4)$$

$$T_r/T_s = \alpha \quad (5)$$

where $T_c$, $T_r$ and $T_s$ are respective torques in the carrier, ring gear and sun gear, respectively. Note that ring gear is larger than sun gear such that ratio $\alpha > 1$. Thus Equation (2) leads to A<1, B<1 and A>B.

With the above introduction, we now turn to select a preferable configuration for a given application. In one configuration, it is desirable to have highest torque ratio between the second output shaft 9 and the first output shaft 11, so that the demand for the size of hydraulic machine 31 at the first output shaft 11 will be smallest for a given driveline torque requirement. One can find out the following maximum ratio from Equations. (3) to (5), $$|T_c/T_s| = 1 + a \quad (6)$$

From the above equations it can be concluded that an optimized configuration can be: the ring gear 14 as input, the sun gear 11a as first output and carrier 12 as second output. In such a configuration, the torque ratio from input to second output (driveline) is equal to 1/A or $(1+1/\alpha)$, and the torque ration from input to first output is $\alpha$.

Now the description turns to how the power split and creep drive work in the present disclosure. In a first step, the chassis system 29 is made ready for the 'work (sweep) mode', which generally means shifting the transmission 2 to a desirable gear and letting the engine 1 run at a pre-selected rotational speed. The choice of such a speed is to allow the chassis engine 1, torque convertor, and transmission 2 to work at their desirable ranges to satisfy the minimum requirement of work (sweeping) functions on power demands. For a typical chassis with an automatic transmission, such a status can be quite easily achieved by programming.

After the vehicle has been readied for the work mode, the couplers 6 and 7 are shifted to place the system into the 'work (sweep) mode.' As shown in FIG. 1, shifting the couplers 6, 7 will cause the transmission output 3 to reach gear 15 via shaft 4, coupler 6 and gear 5. Then engine power will split into two paths: left to PTO 16 and right to the ring gear 14 of planetary gear set. As the PTO portion is straightforward and well understood by those skilled in the art, the primary focus of the disclosure is the creep drive mechanism at the right-hand-side of the schematic.

Figure 2:
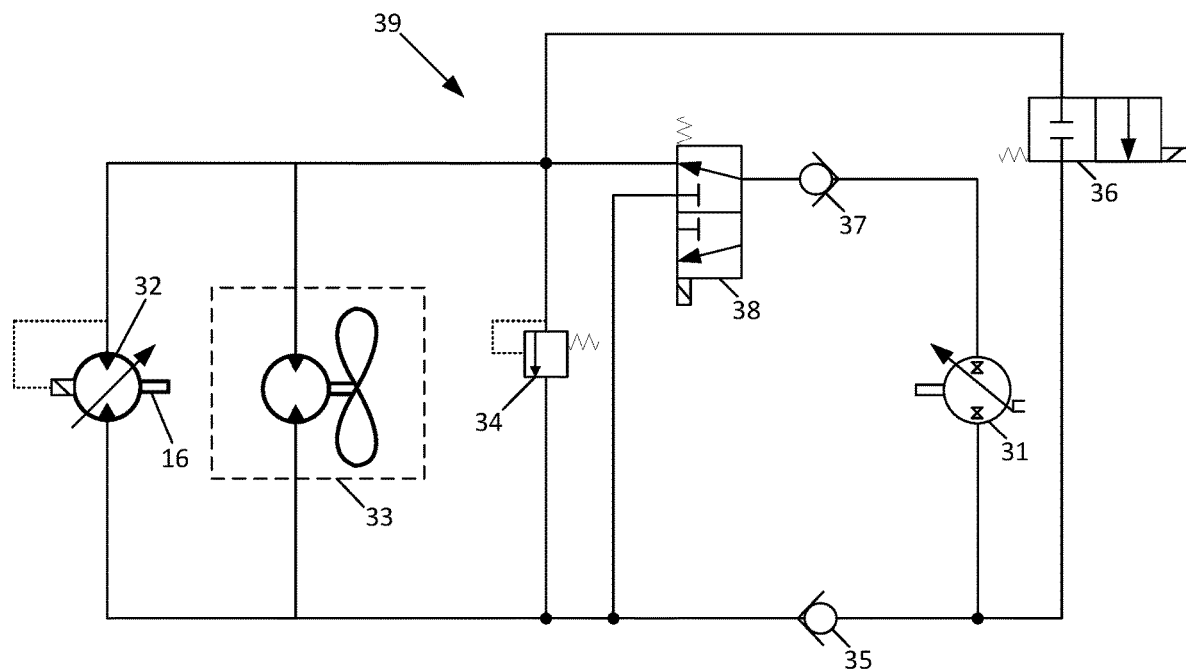
FIG. 2 shows a general hydraulic circuit includes hydraulic pump from PTO to power work equipment and a variable displacement hydraulic machine to vary the output torque. Note that the two directional valves are for forward and reverse propulsion shifting. Thus said hydraulic machine will be a pump during forward creeping drive and a motor in reverse drive.
Figure 2A:
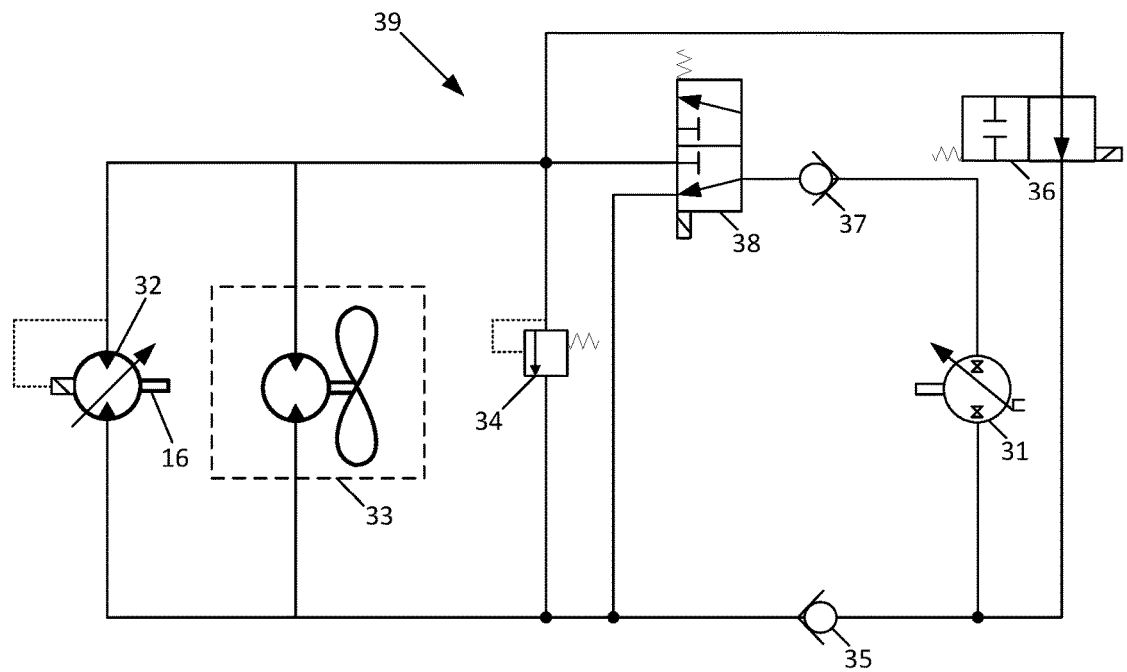
FIG. 2A shows the hydraulic circuit of FIG. 2 with the control valves moved to allow for a reverse drive of the vehicle.

Initially, while the sun gear 11a rotates as driven by ring gear 14, carrier 12 may not rotate until its torque reaches a balance with the sun gear 11a. The torque at the carrier is balanced from the road traction effect (i.e. from wheels 24, axle 23, axle reduction box 22, driveline 21 to shaft 9, coupler 7 and gears 8 and 10). Only after such torque resistance is overcome, will the carrier start to rotate and start to propel the vehicle. Notably, the sun gear 11a is externally connected to hydraulic work machine 31, which in this case is configured as a variable displacement hydraulic motor/pump. In the work mode, the hydraulic work machine functions as a pump when the vehicle is in the work mode. The hydraulic work machine 31 can join the work equipment system with substantially the same pressure, as shown in FIG. 2. In one aspect, the hydraulic work machine 31 has a displacement volume $q_s$ (in$^3$/rev), wherein torque $T_s$ is defined by $$T_s = \eta_s p q_s / (2\pi) \tag{7}$$

wherein system pressure is p and $\eta_s$ is efficiency factor of machine 31.

When maintaining the pressure relative the same but alternating the displacement volume of the hydraulic machine 31, which could be achieved by using the signal for acceleration pedal in the cab, for example, the torque will be changed accordingly. As a result, the output torque and speed of the hydraulic work machine 31 can be varied continuously.

Now if the operator presses down the acceleration pedal to increase the engine throttle, the torque in the ring gear 14 and hydraulic machine 31 (so thus the sun gear 11a) increases. As soon as the torque at the carrier 12 can overcome the resistance from the road, it will start to rotate. The resulting drive ratio can be varied continuously as the throttle and road condition changes, following the planetary gear governing equations described above.

Note that a novel feature of present disclosure is that the variable creep speed is achieved by using the hydraulic machine 31 as a pump instead of a hydraulic motor drive, and the machine 31 also generally contributes pressure flow to the work (sweeping) equipment during creep drive.

In addition, the volume size of the hydraulic machine in present disclosure could be significantly smaller than a motor required to propel a vehicle directly. As discussed before and shown in Equation (5), the hydraulic machine (a pump in this case), would be only 1/α in size. For example, when a ring gear teeth number/sun gear teeth number=2.4, it leads to $$1/\alpha = 1/2.4 = 0.417 \tag{8}$$

which means the size of hydraulic machine 31 would be only 41.7% of a direct drive motor.

Furthermore, as the engine power distributed mechanically between the propulsion and sweeping or like working functions, no negative power recirculation is present. This power splitting system is thus highly efficient.

The adaption of the present disclosure to an on-highway chassis is straightforward. In 'working (sweeping)' mode, it is simply to set the engine to a higher 'ideal' speed to meet the power demand from work equipment which could be substantially higher than normal ideal. In the meantime, the proper gear ratio at the transmission 2 is selected to meet with the speed and torque requirements. The above can be easily achieved through chassis programming and turned on by a switch by the vehicle operator.

An additional modification can be using the acceleration pedal signal to alternate the operation of the hydraulic machine 31. Nowadays on-highway chassis is commonly equipment with computer control modules, such a signal is readily available from CAM BUS. The mechanism is to change the work machine displacement, so thus the torque, according to the acceleration pedal signal inside the cab. As a result, driving the vehicle in 'work (sweep)' mode is very much the same as a standard vehicle for the operator.

At the PTO, a hydraulic pump 32 is normally attached, as can be seen at FIG. 2. In some applications, it is desirable for the hydraulic pump 32 to be a pressure-compensated variable displacement pump, so that when the chassis transmission speed becomes too high, the displacement volume will be automatically reduced to maintain a preset pressure. FIG. 2 shows an exemplary closed hydraulic work circuit 39 for powering the work functions of the vehicle 29. As shown, the work circuit includes the hydraulic work machine 31 and the hydraulic pump 32. The work circuit 39 can also include rotary powered equipment units 33. Examples of such equipment 33 are hydraulic motors that power brooms, conveyors, fans, and vacuum pumps. The closed hydraulic work circuit can also include a relieve valve 34, check valves 35, 37, and control valves 36, 38 to ensure proper operation of the work circuit. The position of the control valves can be controlled by an electric or electronic actuator in communication with either the vehicle controller or a specialized controller for the work system.

Occasionally, there are needs to propel a vehicle reversely during the working (sweeping) process. The disclosed system addresses this function by simply switching the hydraulic machine 31 from pump to motor status, without shafting away from the 'working (sweeping)' mode. This can be accomplished by activating the two directional valves 36 and 38 to the position shown in FIG. 2A. The propulsion speed control in reverse is thus very much the same as creeping forward. Note that the working equipment performance would be affected by the change of hydraulic machine 31 from pump to motor, but, fortunately, such a reverse is usually short time and will not impact the working performance too much. As a matter of fact, such as in a street sweeper application, it is sometimes required to shut down the broom sweeping functions during reserve to avoid possible damage to the equipment.

It appears that the disclosed approach will be very beneficial to provide a solution to single engine street sweeper or like specialty vehicle where no extra motor or hybrid drive is required. Thus it will provide a solution for more fuel efficient and environmental friendly, easy to operate and maintain, and lower manufacturing and ownership cost.

Although the disclosed examples have been shown and described with respect preferred embodiments thereof, it should be understood by those skilled in the art that various changes and omissions, such as using the ring gear or sun gear instead of the carrier as the input shaft, in the form and detail thereof may be made therein without departing from the spirit and the scope of the disclosure. It should also be appreciated that the exemplary embodiments are examples only, and are not intended to limit the scope, applicability, or configuration of the disclosure in any way.

What is claimed:

1. A single engine street sweeper comprising:
  a. a truck chassis including a drive wheel axle;
  b. a variable transmission supported by the truck chassis and operably connected to the drive wheel axle;
  c. a power split drive system located between the variable transmission and drive wheel axle, the power split drive system including:
    i. a first power input shaft operably connected to the variable transmission;
    ii. a first power output shaft operably connected to a hydraulic motor/pump;

iii. a second power output shaft operably connected to the drive wheel axle;
iv. a third power output shaft operably connected to a hydraulic pump and to the first power input shaft;
v. a planetary gear set interconnecting the first power input shaft with the first and second power output shafts;
vi. a hydraulic work circuit including the hydraulic motor/pump and the hydraulic pump;
d. wherein the single engine street sweeper is operable between:
i. a transport mode in which the power split drive system is disengaged such that all power from the variable transmission is directed to the drive wheel axle; and
ii. a work mode in which the power split drive system is engaged such that power can be selectively distributed from the variable transmission to the drive wheel axle and to the hydraulic motor/pump operating as a hydraulic pump, wherein the work mode includes a reverse drive mode in which the hydraulic motor/pump operates as a hydraulic motor driven by the hydraulic pump associated with the third power output shaft.

2. The single engine street sweeper of claim 1, wherein the first power input shaft is connected to a ring gear of the planetary gear set, the first power output shaft is connected to a sun gear of the planetary gear set, and the second power output shaft is connected to a planet gear carrier of the planetary gear set.

3. The single engine street sweeper of claim 1, further including a coupler assembly that operates the single engine street machine between the transport and work modes.

4. The single engine street sweeper of claim 1, wherein the hydraulic motor/pump is a variable displacement device.

5. The single engine street sweeper of claim 4, wherein the relative proportion of power delivered to the drive wheel axle and the hydraulic pump/motor is controlled by varying the displacement of the hydraulic motor/pump.

6. A power split drive system for converting a single engine over-the-highway vehicle to a specialty work vehicle with work functions powered by the single engine, the power split drive system comprising:
a. a first power input shaft configured for operable connection to the single engine;
b. a first power output shaft operably connected to a hydraulic motor/pump;
c. a second power output shaft configured for operable connection to a drive wheel axle of the vehicle;
d. a third power output shaft operably connected to a hydraulic work circuit or power take-off unit;
e. a planetary gear set interconnecting the first power input shaft with the first and second power output shafts;
f. wherein the power split drive system is operable between:
i. a transport mode in which the power split drive system is disengaged such that all power from the first power input shaft is directed to the second power output shaft; and
ii. a work mode in which the power split drive system is engaged such that power can be selectively distributed from the first power input shaft to the first power output shaft such that the hydraulic motor/pump operates as a hydraulic pump and to the second power output shaft, wherein the work mode includes a reverse drive mode in which the hydraulic motor/pump operates as a hydraulic motor driven by a hydraulic pump associated with the third power output shaft.

7. The power split drive system of claim 6, wherein the first power input shaft is connected to a ring gear of the planetary gear set, the first power output shaft is connected to a sun gear of the planetary gear set, and the second power output shaft is connected to a planet gear carrier of the planetary gear set.

8. The power split drive system of claim 6, further including a coupler assembly that operates the power split drive system between the transport and work modes.

9. The power split drive system of claim 6, wherein the third power output shaft is operably connected to the hydraulic work circuit or power take-off unit and to the first power input shaft.

10. The power split drive system of claim 6, wherein the hydraulic motor/pump is a variable displacement device.

11. The power split drive system of claim 10, wherein the relative proportion of power delivered to the first and second output shafts is controlled by varying the displacement of the hydraulic motor/pump.

12. A single engine vehicle converted from a highway truck chassis comprising:
a. a vehicle including a chassis, a cab, a single engine, and a driveline including axles and wheels;
b. a work system to perform work functions, the work system including a variable displacement hydraulic machine;
c. a power split device with a variable transmission mechanically connecting the chassis single engine to the work system and the driveline, the power split device including:
i. an input component with a shaft joining to the chassis engine;
ii. a hydraulic work circuit port or power-take-off port to provide power for work equipment;
iii. at least one planetary gear set, in which:
1. a first output component with a shaft connecting to the variable-displacement hydraulic machine, which is able to provide power to the work system from the input component;
2. a second output component with a shaft connecting and providing power to the vehicle driveline from the input component; and
d. a control system to manage the hydraulic machine, wherein power from the single engine can be selectively distributed between the work system and the vehicle driveline, and wherein the variable displacement hydraulic machine operates as a hydraulic pump in a 'work (sweep)' mode during forward propulsion of the vehicle such that pressurized fluid is provided by the hydraulic machine to drive the work equipment, and wherein the hydraulic machine operates as a hydraulic motor in reverse propulsion of the vehicle to drive the vehicle.

13. The power split drive system of claim 12, wherein a speed of the second output component is variable such that a vehicle propulsion speed is variable.

14. The power split drive system of claim 13, wherein the vehicle can creep from 0 to 20 miles per hour in a work mode of the power split device.

15. The power split drive system of claim 13, wherein the vehicle can creep from 0 to 5 miles per hour in the work mode.

16. The power split drive system of claim 13, wherein the variable displacement hydraulic machine operates as a pressure-compensated variable displacement pump.

17. The power split drive system of claim 13, wherein there is at least one coupler to engage the input component with the power-take-off port and planetary gear set to switch the vehicle between the 'work (sweep)' mode and a 'transport' mode.

18. The power split drive system of claim 12, wherein the work system includes at least one hydraulic pump, connected to the hydraulic work circuit port or power take-off port.

19. The power split drive system of claim 12, wherein the planetary gear set includes a ring gear serving as an input component, a sun gear connected to the first output component and a planet gear carrier connected to the second output component.

20. The power split drive system of claim 12, wherein the control system communicates with chassis engine control modules and controls the displacement of the hydraulic machine to vary a torque of the variable displacement machine in response to an acceleration pedal signal inside the vehicle cab.

21. The power split drive system of claim 12, wherein the hydraulic machine is switched between operating as a pump and a motor by operation of directional control valves.

22. The power split drive system of claim 17, wherein the coupler connects the input component to second output component directly in the transport mode, such that an on-highway chassis original driveline arrangement is restored.

23. A power split device with a variable transmission for mechanically connecting a chassis single engine to a work system and to a vehicle driveline, the power split device comprising:
   a. an input component with a shaft for joining to the chassis engine;
   b. a hydraulic work circuit port or a power-take-off port to provide power for work equipment;
   c. a variable displacement hydraulic work machine;
   d. at least one planetary gear set, in which:
      i. a first output component with a shaft for connecting to the hydraulic work machine, which is able to provide power to a work system from the input component;
      ii. a second output component with a shaft for connecting and providing power to the vehicle driveline from the input component; and
   e. a control system to manage the hydraulic work machine, wherein power from the single engine can be selectively distributed between the work system and the vehicle driveline system, wherein the variable displacement hydraulic machine operates as a hydraulic pump in a 'work (sweep)' mode during forward propulsion of the vehicle such that pressurized fluid is provided by the hydraulic machine to drive work equipment, and wherein the hydraulic machine operates as a hydraulic motor in reverse propulsion of the vehicle to drive the vehicle.

24. The power split device of claim 23, wherein a speed of the second output component is variable such that a vehicle propulsion speed is variable.

25. The power split device of claim 24, wherein the variable displacement hydraulic machine operates as a pressure-compensated variable displacement pump.

26. The power device system of claim 23, wherein the planetary gear set includes a ring gear serving as an input component, a sun gear connected to the first output component and a planet gear carrier connected to the second output component.

27. The power split device of claim 23, wherein the control system is configured to communicate with a chassis engine control module and controls the displacement of the hydraulic machine to vary a torque of the variable displacement machine in response to an acceleration pedal signal inside a vehicle cab.

28. The power split device of claim 23, wherein the hydraulic machine is switched between operating as a pump and a motor by operation of directional control valves.

29. The power split device of claim 23, wherein there is at least one coupler to engage the input component with the power-take-off port and planetary gear set to switch the vehicle between the 'work (sweep)' mode and a 'transport' mode.

30. The power split device of claim 29, wherein the coupler connects the input component to second output component directly in the transport mode, such that an on-highway chassis original driveline arrangement is restored.

* * * * *